O. BEIER.
DOUGH CONVEYING APPARATUS.
APPLICATION FILED OCT. 28, 1909.

983,669.

Patented Feb. 7, 1911.

2 SHEETS—SHEET 1.

Witnesses:
W. T. Smith
B. G. Richards

Inventor:
Otto Beier,
By Joshua R. H. Potts
his Attorney.

O. BEIER.
DOUGH CONVEYING APPARATUS.
APPLICATION FILED OCT. 28, 1909.

983,669.

Patented Feb. 7, 1911.

2 SHEETS—SHEET 2.

Witnesses:
W. E. Smith
B. T. Richards

Inventor:
Otto Beier,
By Joshua R. H. Potts
his Attorney.

UNITED STATES PATENT OFFICE.

OTTO BEIER, OF DIXON, ILLINOIS.

DOUGH-CONVEYING APPARATUS.

983,669.  Specification of Letters Patent. Patented Feb. 7, 1911.

Application filed October 28, 1909. Serial No. 525,189.

*To all whom it may concern:*

Be it known that I, OTTO BEIER, a citizen of the United States, residing at Dixon, county of Lee, and State of Illinois, have invented certain new and useful Improvements in Dough-Conveying Apparatus, of which the following is a specification.

My invention relates to an improved means for conveying dough during the process of raising the same, the object of the invention being the provision of an apparatus of this character which shall be efficient in operation and especially adapted for use in bakeries where large quantities of bread are made.

A further object of my invention is to provide suitable hangers for the conveyer belt and readily adjustable means therefor whereby said belt may be made to run in the most satisfactory manner.

Other objects will appear hereinafter.

With these objects in view my invention consists in the novel construction and arrangement of parts which will be hereinafter fully described and more particularly pointed out in the appended claims.

My invention will be best understood by reference to the accompanying drawings forming a part of this specification, and in which—

Figure 1:
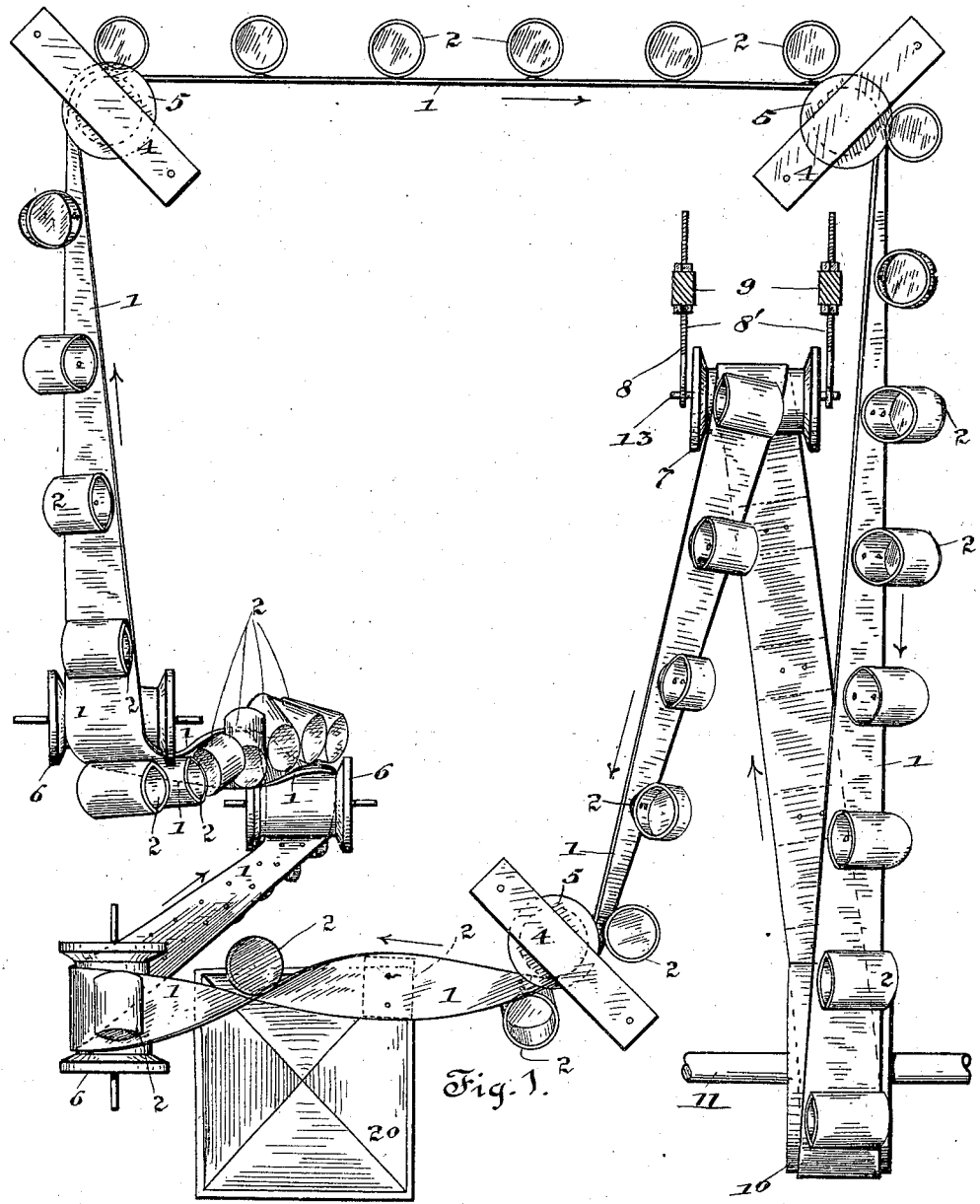
Figure 2:
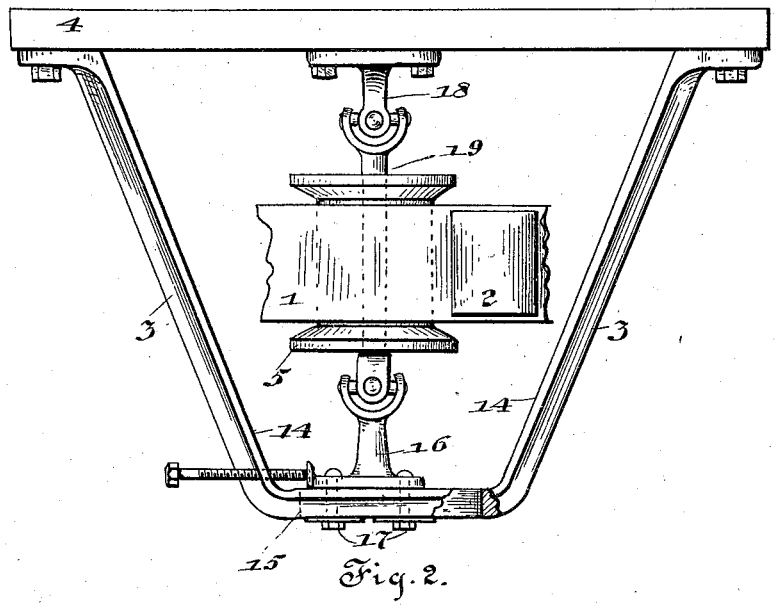
Figure 3:
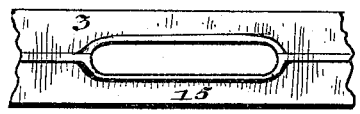
Figure 4:
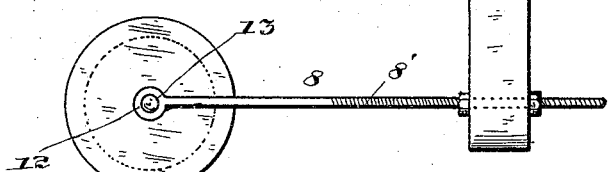

Figure 1 is a top plan view of my improved dough conveying apparatus in its preferred form, Fig. 2 is a detail view showing the construction of a hanger for the vertical pulleys of the apparatus, Fig. 3 is a partial bottom view of said hanger, and Fig. 4 is a detail view showing a belt tightening device.

Referring now to the drawings, 1 designates an endless belt which may be of any suitable material but formed preferably of a plurality of canvas layers sewed together, and 2 a metallic dough receptacle of which a large number are riveted to said belt. The hangers 3 are attached to planks 4 which may be secured to the ceiling of a room (not shown), and in these hangers the vertical pulleys 5 of the apparatus are adjustably mounted, the adjusting means of which is described hereinafter.

The pulleys 6 are mounted in ordinary hangers (not shown) and the pulley 7 is mounted in a belt tightening device 8 which comprises two hangers 9 which depend from and are secured to the ceiling. The driving pulley 10 is mounted on the driving shaft 11 for which any suitable bearings may be provided. Electrical or other available power may be used for driving shaft 11.

The belt tightener 8 shown in the drawings may be used in the apparatus but any other well known similar device may be employed. In the device as illustrated two horizontally threaded rods 8′ are adjustably secured in the hangers 9, and eyes 12 are provided on said rods to receive the pulley shaft 13, the pulley 7 being loosely mounted on the latter.

Each hanger 3 comprises two downwardly converging side members 14 and a horizontally slotted portion 15 integral with the members 14, and on this slotted portion a support 16 is adjustably secured by means of the bolts 17. The member 18 is secured to the plank 4, and between this member and the support 16 a shaft 19 is mounted and connected by means of universal joints as shown. This construction allows a horizontal adjustment for the support 16 which is necessary in order to properly tilt the pulley 5 for the most satisfactory action of the belt 1.

The operation is as follows: During the upward travel of the dough receptacles 2 on the conveyer belt 1 as shown at the left of Fig. 1 the dough is placed therein, the belt being twisted during this travel so that the receptacles may pass the pulleys without interference. The receptacles then travel as indicated until they are over the dough hopper 20 which may be positioned on the floor. Here the belt is twisted through two hundred and seventy degrees in order to dump the dough automatically from the receptacles which action completes the operation.

Having described my invention what I claim as new and desire to secure by Letters Patent is:

1. In a device of the class described, a conveyer belt and a series of dough receptacles attached thereto, and a series of pulleys adapted to guide said belt, the said pulleys being arranged to cause said belt to assume a position adapted to permit the insertion of the dough during one stage of its travel and to twist the belt through 270° to cause the automatic discharge of the dough and return of said belt to normal position during another stage of its travel, substantially as described.

2. In a device of the class described, a conveyer belt and a series of dough receptacles attached thereto, and a series of pulleys adapted to guide said belt, the said pulleys being arranged to cause said belt to assume a position adapted to permit the insertion of the dough during one stage of its travel and to twist the belt through 270° to cause the automatic discharge of the dough and return of said belt to normal position during another stage of its travel, said receptacles being cylindrical in form and having one closed end, substantially as described.

3. In a device of the class described, a conveyer belt and a series of dough receptacles attached thereto, and a series of pulleys adapted to guide said belt, the said pulleys being arranged to cause said belt to assume a position adapted to permit the insertion of the dough during one stage of its travel and to twist the belt through 270° to cause the automatic discharge of the dough and return of said belt to normal position during another stage of its travel, said receptacles being cylindrical in form and secured to said belt by riveting, substantially as described.

4. In a device of the class described, a conveyer belt and a series of dough receptacles riveted thereto, a series of pulleys adapted to guide said belt, the said pulleys being arranged to cause said belt to assume a position adapted to permit the insertion of the dough during one stage of its travel and to twist the belt through 270° to cause the automatic discharge of the dough and return of said belt to normal position during another stage of its travel, and means for adjustably tilting certain of said pulleys, substantially as described.

In testimony whereof I have signed my name to this specification in the presence of two subscribing witnesses.

OTTO BEIER.

Witnesses:
  HOMER E. SENNEFF,
  CHARLIE ELLIS.